Oct. 28, 1924.
T. W. WILSON ET AL
1,512,965
AUTOMOBILE REAR HOUSING SUPPORT
Filed June 8, 1922
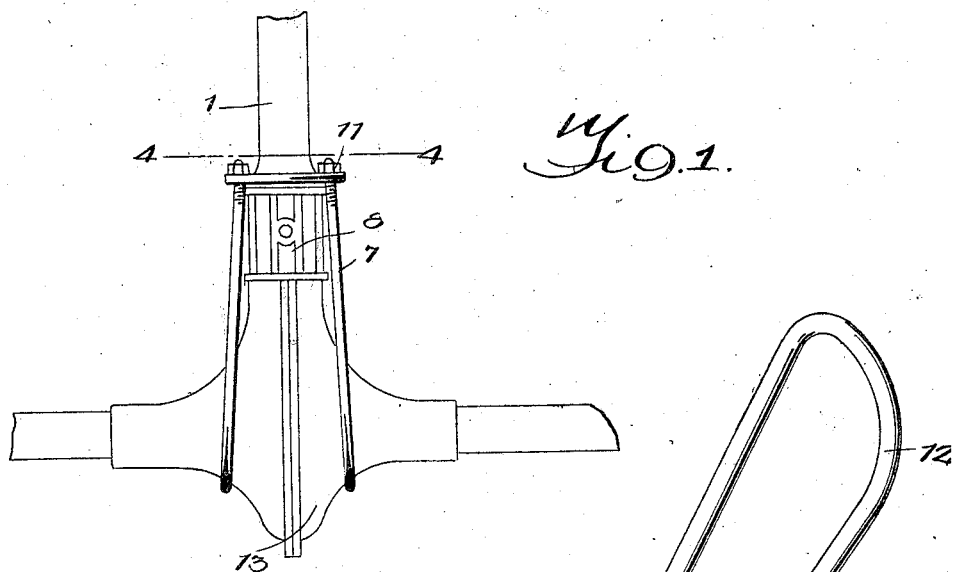
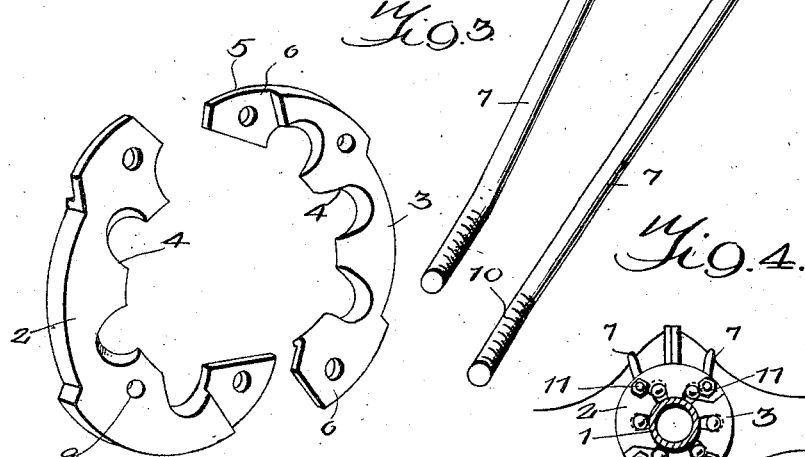
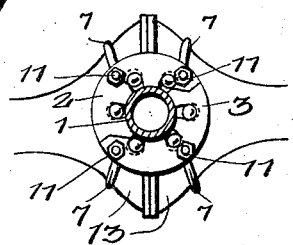
Inventor
T. W. Wilson,
and H. B. Henderson
WITNESSES
By Richard B. Owen,
Attorney Patented Oct. 28, 1924.

1,512,965

UNITED STATES PATENT OFFICE.

THEODORE W. WILSON AND DEE BARNETT HENDERSON, OF EAGLE LAKE, TEXAS.

AUTOMOBILE REAR-HOUSING SUPPORT.

Application filed June 8, 1922. Serial No. 566,909.

*To all whom it may concern:*

Be it known that we, THEODORE W. WILSON and DEE BARNETT HENDERSON, citizens of the United States, residing at Eagle Lake, in the county of Colorado and State of Texas, have invented certain new and useful Improvements in Automobile Rear-Housing Supports, of which the following is a specification.

This invention relates to an improved brace or vibration absorbing device for use in connection with the transmission of an automobile and particularly for use in connection with the differential housing to prevent the bolts thereof from working loose under the action of vibration.

Another object of this invention is the production of a simple and efficient bracing means which is adapted to firmly engage the rear housing connection of an automobile and efficiently support and brace the same in such a manner as to prevent the radius rod connection of the cutting feet from being accidentally broken.

A still further object of this invention is the production of a simple and efficient brace which may be very quickly and easily attached to the differential housing.

With these and other objects in view, this invention consists of certain novel constructions, combinations and arrangements of parts, as will be hereinafter fully described and claimed.

In the drawings:

Figure 1 is a top plan view of a part of the differential housing, showing the rear housing support in position.

Figure 2 is a perspective view of the clamping plate which is adapted to fit around the drive shaft 2.

Figure 3 is a perspective view of one of the U-bolts which is adapted to fit around the differential housing and engage the supporting clamp.

Figure 4 is a section taken on line 4—4 of Figure 1 looking in the direction of the arrow.

By referring to the drawings it will be seen that a sectional clamping plate is employed for fitting snugly around the drive shaft 1 and this sectional clamping plate or clamp comprises a primary section 2 and an auxiliary section 3. Each of these sections is provided with suitable notches 4 upon the inner face thereof, which notches are adapted to fit snugly around the usual bolt carried by the roller housing and in this way permits the sections 2 and 3 of the clamping plate to fit snugly against the forward end of the housing. The respective sections 1 and 2 are provided with overlapping ends 5 which are adapted to snugly fit together, having their outer faces flush. The respective notched ends 5, which form the overlapping structure, are provided with registering apertures 6, the ends of the U-shaped bolts 7 being adapted to pass therethrough for firmly holding the sections in an assembled position and at the same time connecting the clamping sections firmly in engagement with the roller bearing housings 8. Other apertures 9 are also formed in the sections 2 and 3 of the clamping plate for the purpose of receiving the forward ends of the bolts 7 as will be obvious.

Each bolt 7 is provided with a pair of substantially parallel threaded ends 10, these ends 10 being adapted to pass through the apertures 6 and 9 formed in the sections 2 and 3 of the clamping plate, and receive the nut 11 for firmly clamping the U-shaped bolts 7 in engagement with the sections of the clamp. Each bolt 7 is also provided with a wide rear end 12 to fit snugly over the differential housing 13 and conform to the contour thereof. It should be understood that by tightening the nut 11 upon the threaded ends 10 of the bolt 7 the bolt may be drawn tightly around the differential housing 13 to efficiently place the housing in engagement with the drive shaft 1 and in this way greatly lessen the vibration of the differential housing and minimize the possibility of an improper connection or the breaking of the connection between the drive shaft 2 and the differential housing and at the same time firmly bracing the rear axle to prevent the unnecessary vibration on the radius rod connection point as will be obvious.

It is a well known fact that the common fault with most rear housing connections is that there is a tendency of the bolts in the roller bearing housing to have their threads stripped or broken off, thereby throwing the drive shaft out of alignment with the differential. This, of course, will very often result in the stripping of the gears in the differential and in many cases break the rear housing itself.

Another great fault with the rear end in most automobiles is that when due to travel over rough roads, a great amount of vibration takes place upon the radius rod or at their connections, this vibration causing the stripping of the threads therefrom and very often causing the disconnection of the radius rod from the rear axle. By means of the present device a very simple and efficient brace has been produced which may be very readily and conveniently attached for firmly bracing the rear axle and supporting the drive shaft 2 in engagement with the differential housing.

It should be further understood that certain detail changes in the mechanical construction may be employed without departing from the spirit of the invention so long as these changes fall within the scope of the appended claims.

What is claimed is:

1. A device of the class described, comprising a clamp formed of a plurality of sections, each section provided with a plurality of notches upon its inner face adapted to fit over the securing nuts of the roller bearing housing of the drive shaft of an automobile, substantially U-shaped bolts adapted to straddle the differential housing of an automobile, the forward ends of the bolts being passed through the clamp, and nuts threaded upon the forward ends of the bolts for firmly locking the clamp upon the roller bearing housing of the differential, and efficiently bracing the differential housing with respect to the drive shaft.

2. In an automobile transmission and differential housing brace, a clamp including a plurality of sections each section provided with means adapted to receive the securing nuts of the roller bearing housing of the drive shaft, and means connecting the differential housing with said clamp thus firmly locking the clamp upon the roller bearing housing.

In testimony whereof we affix our signatures in presence of two witnesses.

THEODORE W. WILSON.
DEE BARNETT HENDERSON.

Witnesses:
MARY F. TAYLOR,
FRANK B. RINOWE.